Oct. 11, 1955

D. O. R. LUNDQVIST 2,720,573

THERMISTOR DISKS

Filed June 27, 1951

Dick Olof Ragnar Lindqvist
Inventor

By Leech and Rodine
attorneys

United States Patent Office 2,720,573

Patented Oct. 11, 1955

2,720,573

THERMISTOR DISKS

Dick O. R. Lundqvist, Stockholm, Sweden

Application June 27, 1951, Serial No. 233,783

13 Claims. (Cl. 201—63)

Electrical resistance elements consisting of semi-conductor bodies having a high negative temperature coefficient in respect of the electrical resistance, have nowadays an extensive application in the art. They are generally termed thermistors. By the fusing or sintering of semi-conductor material the thermistor element may be made in a variety of different shapes, such as beads having filamentary electrodes, rods or disks having electrodes of sprayed-on or chemically deposited metal etcetera. In may cases the shape of thin disks is advantageous, for instance, when it is the question about so called electrical compensation resistances having a relatively low resistance value and adapted closely to follow the variations of the temperature of the surroundings or of the apparatus concerned respectively or when certain cases of measurement and control of temperatures by means of thermistor elements are concerned.

The present invention relates to a method for producing a new type of thermistor disks which afford very good properties for several different purposes and consists substantially therein that a thin layer of an electrically semi-conducting mass is brought to make contact by its opposite sides with disk shaped metal electrodes whereupon the unit as a whole is heated at least so far that the semi-conductor layer starts to sinter and, in the consecutive cooling off, adheres to the electrodes. The unit obtained forms a body covered by metal on both sides. A thermistor disk produced in this way will have a good mechanical strength and form good electrical and thermal contacts between the semi-conductor and the metal which are independent of the mechanical pressure. In certain cases it has proved to be of advantage to use an embodiment with two or more semi-conductor layers and intermediate metal disks provided in the same unit.

It may, however, occur that the sintering of the semi-conductor layer is not sufficient to insure the adherance between said layer and the metal electrodes. According to the invention the heating may then be carried so far that the material in the semi-conductor layer is fused and is allowed, in this state, to react with the superficial layer of the electrodes. Hereby the semi-conductor layer will enter into a more intimate combination with the metal in the electrode disks and obtain a more homogeneous structure. Further, there is obtained in the transitory layer between the electrode and the semi-conductor a gradual merging of the metal or metals included in the electrode into a mixture of oxides corresponding to the metals of the alloy and a merging of said mixture into the oxide-mixture corresponding to the composition of the semi-conductor. Said transitional layer should only constitute an insignificant fraction of the thickness of the semi-conductor to prevent any detrimental influence upon the total electrical resistance of the disk.

As semi-conductor material there may be used mixtures of the oxides of heavy metals. These are metals whose specific gravities are greater than 4, such as copper, manganese, iron, chromium, cobalt and nickel. For the production of thermistor disks according to the invention mixtures of 100 parts of weight of cupric oxide and 10 to 50 parts by weight of manganese oxide have been proved to be advantageous, inter alia, in view of a suitable melting point and good electrical properties. To regulate the electrical resistance and the temperature coefficient of said resistance, there are preferably added 1 to 20 parts by weight of nickel oxide and/or ferrous oxide to the system of cupric oxide and manganese oxide.

The semi-conductor mass is preferably supplied in a controlled quantity to a metal disk with a uniform distribution, for instance, by weighing up and spreading-out dry powder of the material or a plastic mass moistened by a suitable liquid so as to form a layer of the desired thickness which is then dried. After putting on the second metal disk or, as the case may be, two or more such disks with interposed semi-conductor material in a multilayer, the unit is heated unto sintering or melting, for instance, in an electric furnace, and, if desired, under the access of air. The best homogeneity and stability of the product is generally obtained by fusing the semi-conductor mass. The thickness of layer should be at least 0.05 and at most 0.5 millimeter. In many cases a thickness of about 0.1 millimeter is preferable.

Depending on the composition of the semi-conductor mass and, as the case may be, a partial reduction and the sintering or melting procedure and the consecutive heat treatment the specific resistance of the semi-conductor is regulated within wide limits, for instance, between 100 and 10,000 ohms per $Cm^{-3}$ and a negative temperature coefficient in respect of the electrical resistance is maintained in a range, for instance, between two percent and four percent for each degree centigrade at ordinary temperature. (The functional connection between the resistance and the temperature is assumed to be such that the temperature coefficient is reduced when the temperature rises and vice versa.) In view of the stability the working range is restricted upwards to 300° or 400° C. depending on the requirements in each case.

It has been proved that the disk shaped electrodes must be made of such metals or alloys which comply with certain special requirements. On the one side, said disks must have such properties that, upon sintering or melting of the semi-conductor mass, they are wetted by and fixed to said mass without the thermistor disk being chemically attacked and its electrical or mechanical properties impaired. On the other hand, the thermal expansion coefficient of the electrode disks must be of such a size that detrimental tensions and deformations are avoided in the process of manufacture and in the application at varying temperatures. Extensive research has revealed, inter alia, that a semi-conductor mass of the above stated type has a very small thermal expansion coefficient, i. e. about $3$ to $5 \times 10^{-6}$ in the range of 0 to 500° C. In sintering or melting the semi-conductor mass is chemically active as it has strong oxidizing properties. According to the invention the production of thermistor disks of the type in question is rendered possible by using, as electrode material, alloys of iron and nickel or iron, nickel and cobalt, for instance, 67% iron and 33% nickel or 55% iron, 28% nickel and 17% cobalt. These metals it will be recognized are all from group VIII, series 4 of the periodic table of elements. Generally alloys of invar type or kovar type, nilo and sivar type may be found suitable. Also other alloys may be used. Typical is that they have a considerable resistance to oxidation in comparison with unalloyed iron and have a thermal expansion coefficient which is $5 \times 10^{-6}$ or less in the range of 0 to 500° C.

The electrodes are generally made with circular shape, for instance, by punching-out from metal sheet having a thickness of 0.3 to 1 millimeter. The diameter may be varied, for instance, from 3 to 30 millimeters. By the introduction of certain standard dimensions and a few diierent types of semi-conductor masses having a certain thickness of layer, for instance, 0.1 millimeter there is obtained series of thermistor disks with electrical resistance values varying, for instance, from 1 to 1,000 ohms at ordinary temperature.

After producing the thermistor disks in the sintering or melting process the exterior metal surfaces of the electrodes are provided with suitable contact devices, for instance, connecting wires being soldered or welded on said surfaces. If desired, the disks may be used with exterior metal surfaces solely ground clean or having contact surfaces on their outside which are metallized by spraying or by chemical deposition in suitable manner.

A few embodiments of the invention will be described with reference to the accompanying drawing on which Fig. 1 is a cross-section through a thermistor unit according to the invention.

Fig. 3 is a cross section through a second embodiment whereas

Figure 1:
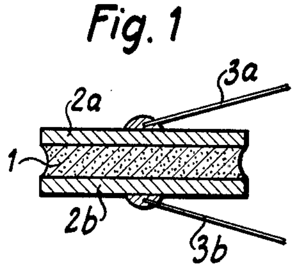
Figure 2:
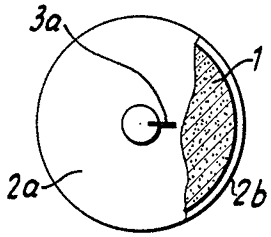
Fig. 2 is the same unit but viewed from the one side.

In Figs. 1 and 2 the semi-conductor mass 1 is surrounded by the metallic electrodes 2*a* and 2*b* carrying wire connections 3*a*, 3*b* soldered thereon.

Figure 3:
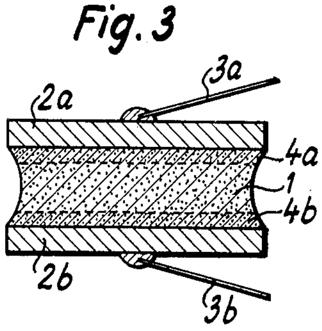

In the embodiment in Fig. 3 the unit has been heated so far that the semi-conductor mass will have transitory zones 4*a* and 4*b* adjacent the electrodes 2*a*, 2*b*.

Figure 4:
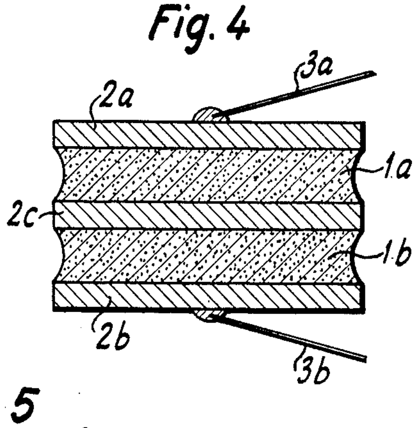
Figs. 4 and 5 are cross sections of a third and fourth embodiment respectively the latter being on an enlarged scale.

In Fig. 4 there is shown a unit consisting of a pile of two semi-conductor layers 1*a*, 1*b* separated by a metallic disk 2*c* and confined by the end electrodes 2*a* and 2*b*.

Figure 5:
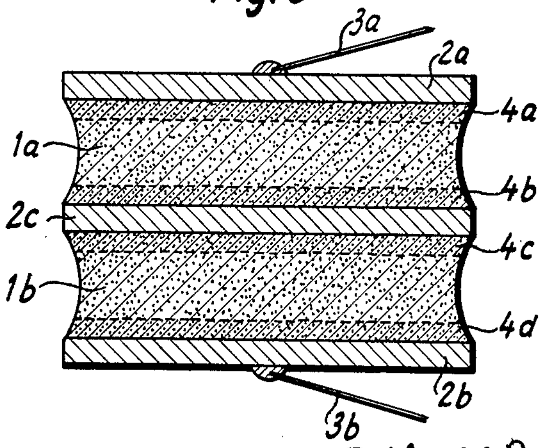

According to Fig. 5 a unit of a type similar to that in Fig. 4 has been heated so far that there are formed four transitory zones 4*a*, 4*b*, 4*c* and 4*d* adjacent the three metallic disks 2*a*, 2*c* and 2*b* respectively.

I claim:

1. The method of producing thermistors comprising the steps of interposing a thin layer of an electrically semi-conducting mass composed of a mixture of at least the oxides of two heavy metals between two solid disc-shaped thin electrodes formed of an alloy of at least iron and nickel, heating the unit as a whole to at least a temperature to sinter the mass, continuing the heating until adhesion commences between the mass and the electrodes and cooling the unit to complete the adhesion.

2. The method as claimed in claim 1 in which the heating takes place with access to air.

3. The method as claimed in claim 1 in which the heating temperature is sufficiently high to melt the semi-conductor, the additional step of maintaining this condition until chemical reaction occurs between the semi-conductor and a superficial layer of the electrodes.

4. The method as claimed in claim 3 in which the heating takes place with access to air.

5. A thermistor unit comprising at least two solid disc shaped metal electrodes containing substantial quantities of iron and a thin interposed layer of semi-conductor mass having a high negative temperature coefficient, said mass including at least one oxide of a heavy metal and being self adherent to the discs as a result of heating in situ to a temperature at least high enough to sinter the mass.

6. A thermistor unit as claimed in claim 5 in which the semi-conductor mass consists of 100 parts of weight of cupric dioxide and 10 to 50 parts by weight of manganese oxide.

7. A thermistor unit as claimed in claim 6, in which the semi-conductor mass also includes 1 to 20 parts by by weight of ferrous oxide.

8. The unit defined in claim 5 containing at least two semi-conductor layers and an intermediate disc-shaped metal electrode between each two adjacent layers.

9. The unit defined in claim 6 in which the semi-conductor mass also includes 1 to 20 parts by weight of nickel oxide.

10. The unit defined in claim 5 in which the electrodes are formed of an alloy of iron and at least one other element of group VIII series of the periodic table of elements.

11. The unit defined in claim 10 in which the coefficient of thermal expansion of said alloy is commensurate with that of the semi-conductor in the temperature range of 0° to 500° C.

12. A thermistor unit as claimed in claim 5 in which which the disc-shaped electrodes are formed of sheet metal of a diameter between 3 and 30 millimeters and of a thickness between 0.3 and 1 millimeter.

13. A thermistor unit comprising at least two solid disc-shaped metal electrodes formed of an alloy containing more than 50% iron and one or more of the remaining elements of group VIII, series 4 of the periodic table of elements and a thin interposed layer of semi-conductor mass having a high negative temperature coefficient, said mass being composed of a mixture of oxides of at least two heavy metals adherent to the discs as a result of heating in situ to a temperature at least high enough to fuse the mass, there being a transition layer between the mass and each electrode comprising progressive reaction products of the metals of the electrode and the materials of the mass.

References Cited in the file of this patent

UNITED STATES PATENTS

| | | |
|---|---|---|
| 929,582 | Garretson | July 27, 1909 |
| 2,273,704 | Grisdale | Feb. 17, 1942 |
| 2,278,072 | Gould et al. | Mar. 31, 1942 |
| 2,496,346 | Haayman et al. | Feb. 7, 1950 |

FOREIGN PATENTS

| | | |
|---|---|---|
| 625,501 | Great Britain | June 29, 1949 |